No. 829,394. PATENTED AUG. 28, 1906.
J. W. GAMBLE.
INTERCHANGEABLE EVENER.
APPLICATION FILED SEPT. 21, 1905.
2 SHEETS—SHEET 1.
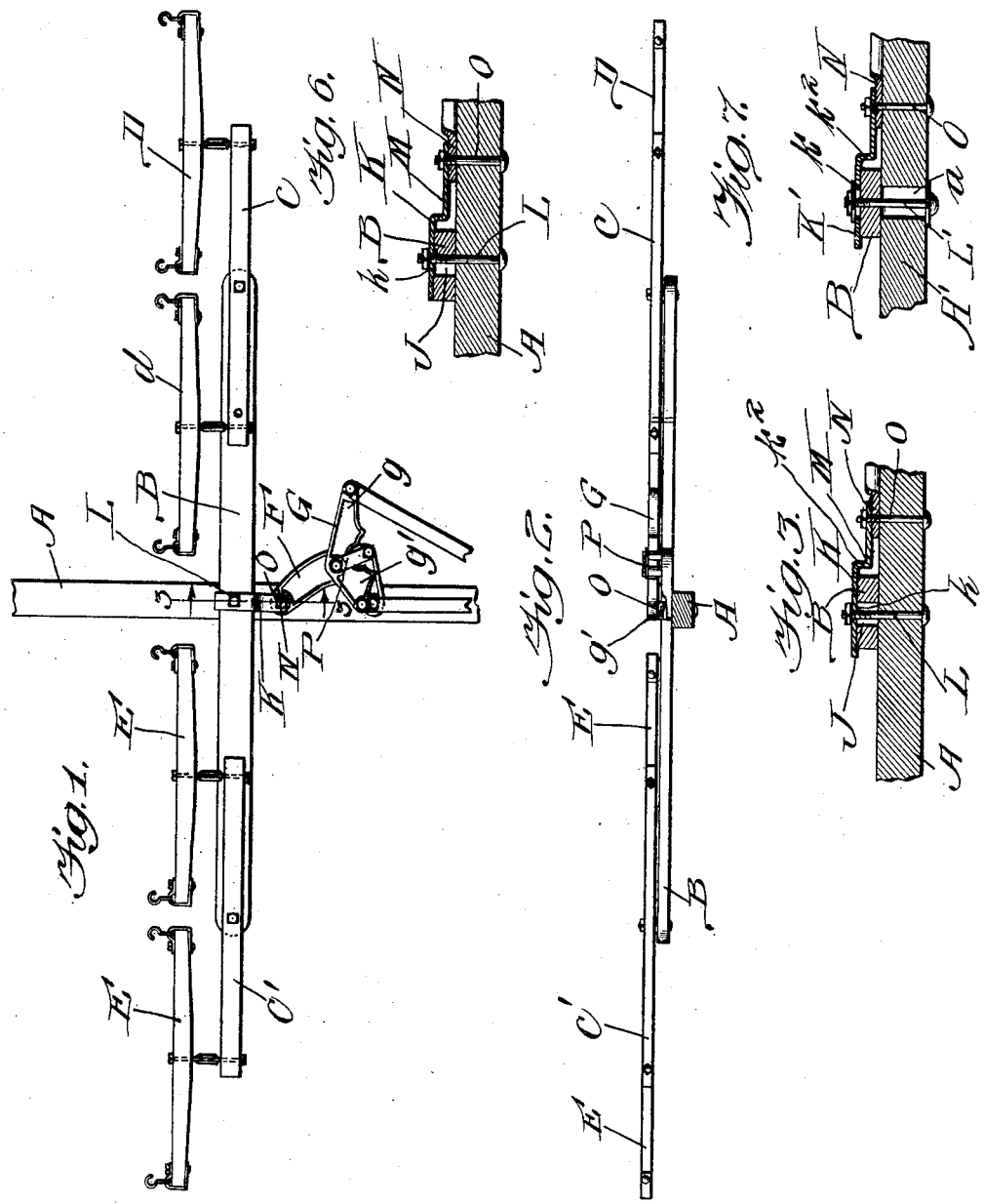

No. 829,394. PATENTED AUG. 28, 1906.
J. W. GAMBLE.
INTERCHANGEABLE EVENER.
APPLICATION FILED SEPT. 21, 1905.
2 SHEETS—SHEET 2.
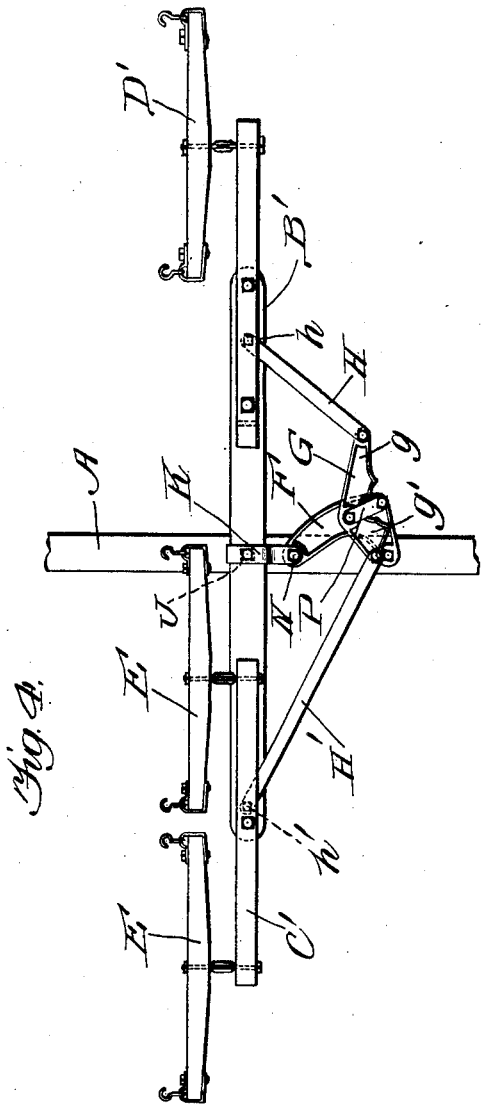
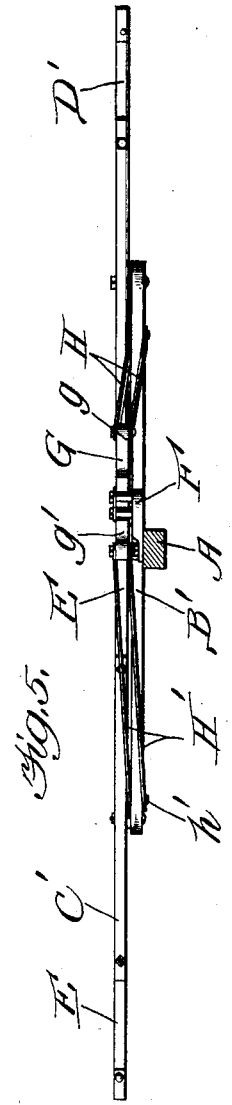

UNITED STATES PATENT OFFICE.

JOSEPH W. GAMBLE, OF CARPENTERSVILLE, ILLINOIS.

INTERCHANGEABLE EVENER.

No. 829,394.      Specification of Letters Patent.      Patented Aug. 28, 1906.

Application filed September 21, 1905. Serial No. 279,509.

*To all whom it may concern:*

Be it known that I, JOSEPH W. GAMBLE, a citizen of the United States, residing at Carpentersville, in the county of Kane and State of Illinois, have invented certain new and useful Improvements in Interchangeable Eveners, of which the following is a specification.

My invention relates to improvements in three or four horse convertible eveners, and has for its object the production of an evener that may be used interchangeably as a three-horse or a four-horse evener with a minimum change of parts.

A further object is to produce an evener device so constructed that while the necessary vibration is provided for the tractional strain will be borne directly and entirely by the evener, thereby insuring a more sensitive and reliable action of the evener.

A further object is the production of a cheap and durable evener by the use of the fewest possible parts and one that is least liable to get out of order.

These and such other objects as may hereinafter appear are attained by my device, embodiments of which are illustrated in the accompanying drawings, in which—

Figure 1 represents a plan view of my device. Fig. 2 represents a rear elevation of Fig. 1. Fig. 3 represents an enlarged detail showing the method of attaching the hammer-strap. Fig. 4 represents a plan view of my device arranged as a three-horse evener. Fig. 5 represents a rear elevation of Fig. 4. Fig. 6 is an enlarged detail showing the device of Fig. 3 in reversed position; and Fig. 7 is an enlarged detail showing a modified arrangement of the tongue, evener-bar, and hammer-strap.

Like letters of reference indicate like parts in the several figures of the drawings.

Referring now by letter to the accompanying drawings, A represents the main tongue of a potato-digger or other like agricultural implement. B represents an evener-bar or cross-bar, to the ends of which are attached whiffletrees or doubletrees C C'. Attached to the ends of the doubletree C are swingletrees D d, and attached to the ends of the doubletree C' are swingletrees E E. Extending through one end of the doubletree C and the evener-bar B is a bolt-hole b, the purpose of which will be explained later. Secured to the tongue A back of the evener-bar B is a bracket F, and mounted on this bracket F is an evener-lever G, comprising a long arm g and a short arm g'. Pivotally secured to the outer ends of the arms of this lever are connecting-rods H H', which are also pivotally connected to the evener-bar at h h'. This bracket and lever and the operation thereof are fully described in my copending application for a draft-evener.

The evener-bar B is preferably provided with a slot J, and a hammer-strap K is secured thereto by means of a bolt L, extending through the slot in the evener-bar. The hammer-strap is bent downwardly at M and preferably extends over the upper end of the bracket F at N and is secured thereto by means of a bolt O passing through the tongue A, the end of the bracket F, and the end of the hammer-strap.

Referring now to the operation of the device, as illustrated in Fig. 1, when the device is to be used as a four-horse evener the connecting-rods H H' (here shown in dotted position) are disconnected from the evener-bar and turned rearwardly upon the tongue or disconnected entirely from the device, if desired. In this position the tractional strain of the four horses is transmitted to the evener-bar B, which is thereby drawn forward against the bolt L, as shown in Fig. 6, and is thereby directly pivoted on the bolt L, and through the bolt L the tractional strain is transmitted to the tongue A. When, however, it becomes advisable to use the device with three horses, as is frequently the case during the busy season, a bolt or pin b' is passed through the bolt-hole b in the doubletree C and evener-bar B, thus securing them rigidly together and making the doubletree C a rigid extension of the evener-bar, as shown in Fig. 4. The swingletree d may then be disconnected or, if preferred, allowed to hang in place. Thereupon the evener-bar B is drawn back to permit the attachment of the connecting-rods H H', which will then connect the evener-bar B with the evener-lever G, the long and short arms of the evener-bar and of the evener-lever being thus placed in counter relation to each other in a familiar manner. In moving the bar B back to permit of attachment to the connecting-rods H H' the bar will be brought to the position shown in Fig. 3, where the bolt L will not be in contact with either the front or rear walls of the slot J, although it may be lightly in contact with the lateral walls of this slot. In this position all strain exerted by the horse attached to the swingletree D is directly transmitted through the connecting-bar H and the arm $g$ of the lever to P, the connection between the evener-lever and the bracket. So, likewise, the strain exerted by the horse attached to the swingletrees E E is transmitted through the connecting-rod H' and the short arm $g'$ of the lever to P, from which point the strain is taken up directly by the tongue. In previous devices of this character while it has been found necessary to pivot the evener-bar to the tongue or similar connections, so as to accommodate the necessary vibration of the evener-bar, the tendency has been to thereby have the pivot-bolt of the evener-bar bear a part of the tractional strain, and so interfere with the action of the evener, which obviously should carry all of the tractional strain; but by the arrangement above described while the bolt L in mid-position, as shown in Fig. 3, will not receive any strain exerted longitudinally of the tongue it will prevent the lateral displacement of the evener-bar, and so will accommodate the vibration of the device without in any manner interfering with the operation of the evener or diverting any part of the tractional strain therefrom. Obviously the same result can be attained by the modified form of my apparatus, (shown in Fig. 7,) in which the hammer-strap K' is provided with a slot $k$. The tongue A' is provided with a corresponding and registering slot $a$, and the bolt L' is rigidly secured in the unslotted evener-bar B'. In this arrangement the bolt L' will be held in mid-position in the slots $k$ and $a$ when the evener is connected with the evener-bar B' by the rods H H', while when the rods H H' are disconnected from the evener-bar B and the device is used with two or four horses the evener-bar B' will be drawn forwardly until the bolt L' abuts against the forward walls of the slots $k$ and $a$. The hammer-strap further serves to rigidly connect the bracket-bar with the other members of the evener and give greater strength to the device.

Obviously my device for connecting the evener-bar with the tongue is of utility when the apparatus is to be used as a three or five horse evener, regardless of its additional utility when the device is to be used interchangeably for an odd or an even number of horses, and if the device were to be used solely as a three-horse evener of course the evener-bar B would be correspondingly shortened, so as to bring all of the horses closer to the tongue, dispensing with the doubletree C, if desired.

It will be noted that in the drawings the hammer-strap K is shown as secured to the bolt passing through the upper end of the bracket F. By this method I secure much greater rigidity of structure; but of course it will be understood that conditions might arise which would render it advisable to place the bracket farther away from the evener-bar and render it impracticable to extend the hammer-strap to connect therewith.

The device illustrated in Fig. 1 is especially valuable to farmers possessed of small means, with a consequent limited number of horses at their disposal, the construction enabling the farmer to utilize four horses on, for example, a potato-digger for the greater part of the day, and then when it becomes necessary to use one of the horses for some other purpose the doubletree C may be bolted to the evener-bar, the connecting-rods H H' put in place, and the work proceed with only three horses. So, also, the use of a hammer-strap and slotted members gives a much greater efficiency to the evener and also increases the life of the implement, as by its use danger from sudden pulls of the horses or strains caused by the encountering of obstacles in the way is largely avoided.

I claim—

1. The combination with a tongue, of a cross-bar pivotally secured thereto and movable longitudinally thereof, doubletrees secured to the opposite ends of said cross-bar, a bracket secured to said tongue, back of said cross-bar and projecting from one side of said tongue, an evener-lever pivoted upon said bracket, normally detachable connections between the arms of said evener-lever and the arms of said cross-bar, and means whereby one of said doubletrees may, at will, be rigidly secured to that arm of the cross-bar which is arranged to be connected with the long arm of said evener-lever, all so arranged that said device may be adapted to be operated by an even number of horses when said cross-bar is disconnected from said evener-lever and to be operated as a draft-evener with an odd number of horses when said cross-bar is connected with said evener-lever and said doubletree is rigidly secured to said cross-bar.

2. The combination with a tongue, of a cross-bar pivotally secured thereto and provided with a long arm or extension, a swingletree secured to said long arm and a doubletree secured to the other, or shorter, arm of said cross-bar, a bracket mounted upon said tongue, behind said cross-bar and extending from one side of said tongue, an evener-lever mounted upon said bracket and provided with arms of unequal length, and means for operatively connecting the arms of said evener-lever with the arms of said cross-bar in counter relation to each other, all so arranged that when the device is used with an odd number of horses the even number of horses will be hitched to that arm of the cross-bar which projects from the side of the tongue opposite to said bracket.

3. The combination with a tongue, of a cross-bar pivotally secured thereto, the arms of said bar being of unequal length, a bracket mounted upon said tongue, back of said cross-bar and projecting from one side of said tongue, an evener-lever pivoted upon said bracket and having arms of unequal length, and connecting-bars diverging from said evener-lever to said cross-bar and pivotally connecting the arms of said evener-lever with those of said cross-bar in counter relation to each other.

4. A draft device, adapted to be operated, at will, without an evener when used with an even number of horses, or as a draft-evener when used with an odd number of horses, said device comprising a tongue, a cross-bar pivotally connected therewith, means whereby an even number of horses may be hitched to said cross-bar so as to have substantially equal leverage on the opposite arms of said cross-bar, means whereby an odd number of horses may be hitched to said cross-bar so that the smaller number of horses will have the greater leverage on said cross-bar, an evener device mounted upon said tongue back of said cross-bar, and normally detachable connections between said evener device and said cross-bar, whereby said evener device may be brought into operation when an odd number of horses is used, and may be disconnected when an even number of horses is used.

5. An interchangeable draft-evener, comprising a tongue, a cross-bar pivotally connected therewith and movable longitudinally thereof, means whereby an even number of horses may be hitched to said cross-bar so as to have a substantially equal leverage upon said cross-bar, means whereby an odd number of horses may be hitched to said cross-bar, so that the smaller number of horses will have the greater leverage upon said cross-bar, an evener device pivotally connected with said tongue behind said cross-bar, normally detachable means whereby, when said cross-bar is moved rearwardly upon said tongue, said evener device may be connected with said cross-bar so as to operate as a draft-evener when an odd number of horses is used, and may be disconnected so as to operate without the evener when an even number of horses is used 6. The combination with a tongue, of a cross-bar, a bolt extending through said tongue and cross-bar, one of said members being provided with a slot, through which said bolt extends, whereby said cross-bar is movable longitudinally of said tongue, doubletrees connected with the ends of said cross-bar, means for additionally connecting one of said doubletrees with said cross-bar at will, an evener device secured to said tongue, and normally detachable connections between said evener and said cross-bar.

7. An interchangeable evener, comprising the combination with a tongue, of a cross-bar, means for connecting said tongue and said cross-bar so as to permit said cross-bar to be vibrated horizontally and to be moved longitudinally of said tongue, whiffletrees connected with said cross-bar, an evener device connected with said tongue, and normally detachable, operative connections between said evener and said cross-bar, all so arranged that when said cross-bar is operatively connected with said evener, said connection between the tongue and cross-bar will not receive the tractional strain from the horses, while when said evener is not operatively connected with said cross-bar such tractional strain will be borne by said connection and not by said evener device.

8. The combination with a tongue, of a cross-bar pivotally and slidably connected with said tongue, a bracket connected with said tongue at one side thereof, doubletrees secured to the ends of said cross-bar, an evener mounted upon said bracket, normally detachable, operative connections between said evener and said cross-bar, and means whereby the whiffletree, on the end of the cross-bar at the bracket side of the tongue, may, at will, be secured to said cross-bar so as to form an extension thereof, all so constructed and arranged that the device may be adapted for use with an odd or an even number of horses at will.

JOSEPH W. GAMBLE.

Witnesses:
F. H. DRURY,
G. Y. DANKWARD.